United States Patent
Fujimura (10) Patent No.: US 11,326,465 B2
(45) Date of Patent: May 10, 2022

(54) COMBINED CYCLE PLANT AND METHOD FOR OPERATING SAME

(71) Applicant: Mitsubishi Power, Ltd., Kanagawa (JP)

(72) Inventor: Daiki Fujimura, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 55 days.

(21) Appl. No.: 17/050,204

(22) PCT Filed: Mar. 19, 2019

(86) PCT No.: PCT/JP2019/011559
§ 371 (c)(1),
(2) Date: Oct. 23, 2020

(87) PCT Pub. No.: WO2019/208030
PCT Pub. Date: Oct. 31, 2019

(65) Prior Publication Data
US 2021/0095572 A1 Apr. 1, 2021

(30) Foreign Application Priority Data
Apr. 27, 2018 (JP) .............................. JP2018-086055

(51) Int. Cl.
*F01D 11/04* (2006.01)
*F01D 25/12* (2006.01)
(Continued)

(52) U.S. Cl.
CPC .............. *F01D 11/04* (2013.01); *F01D 25/12* (2013.01); *F02C 6/18* (2013.01); *F02C 7/224* (2013.01);
(Continued)

(58) Field of Classification Search
CPC ........ F01D 11/04; F01D 13/003; F01D 15/10; F01D 25/12; F01K 23/101; F01K 23/108;
(Continued)

(56) References Cited

U.S. PATENT DOCUMENTS 4,793,141 A * 12/1988 Yanai ...................... F01D 11/04
60/657
5,581,128 A * 12/1996 Royle ................... F01K 23/067
60/39.12
(Continued)

FOREIGN PATENT DOCUMENTS

JP 56-14805 * 2/1981
JP 63-167003 7/1988
(Continued)

OTHER PUBLICATIONS

Office Action dated Aug. 4, 2021 in Korean Patent Application No. 10-2020-7030231, with English-language translation.
International Search Report dated Jun. 18, 2019 in International (PCT) Application No. PCT/JP2019/011559.

*Primary Examiner* — Jesse S Bogue
(74) *Attorney, Agent, or Firm* — Wenderoth, Lind & Ponack, L.L.P.

(57) ABSTRACT

In a combined cycle plant and a method for operating the same, the combined cycle plant is provided with a gas turbine, a waste heat recovery boiler, and a steam turbine, and is also provided with a low-pressure gland steam line for supplying steam to a low-pressure gland portion of a low-pressure turbine, and a first heat exchanging unit which performs heat exchange between gland steam flowing through the low-pressure gland steam line, and fuel gas to be supplied to a combustor.

11 Claims, 6 Drawing Sheets

(51) Int. Cl.
*F02C 6/18* (2006.01)
*F02C 7/224* (2006.01)

(52) U.S. Cl.
CPC ...... *F05D 2210/12* (2013.01); *F05D 2220/31* (2013.01); *F05D 2220/32* (2013.01); *F05D 2220/72* (2013.01); *F05D 2220/74* (2013.01); *F05D 2260/213* (2013.01)

(58) Field of Classification Search
CPC ........ F02C 6/18; F02C 7/224; F05D 2210/12; F05D 2220/31; F05D 2220/32; F05D 2220/60; F05D 2220/72; F05D 2220/722; F05D 2220/74; F05D 2220/76; F05D 2260/213; Y02E 20/16; Y02E 20/18
See application file for complete search history.

(56) References Cited

U.S. PATENT DOCUMENTS

| | | | | |
|---|---|---|---|---|
| 8,277,173 B2* | 10/2012 | Yamashita | ............... | F01D 5/063 |
| | | | | 416/198 A |
| 9,046,037 B2* | 6/2015 | Broesamle | ............... | F01K 23/10 |
| 9,903,276 B2* | 2/2018 | Hotta | ................ | F01K 7/22 |
| 11,066,715 B2* | 7/2021 | Shimizu | .................... | F01D 9/02 |
| 2012/0137683 A1* | 6/2012 | Jurgen | ................... | F01D 19/00 |
| | | | | 60/659 |
| 2018/0163628 A1* | 6/2018 | Vandervort | ............... | F02C 6/18 |
| 2019/0100817 A1* | 4/2019 | Shimizu | ................. | F01K 21/06 |

FOREIGN PATENT DOCUMENTS

| | | |
|---|---|---|
| JP | 8-200010 | 8/1996 |
| JP | 10-311206 | 11/1998 |

* cited by examiner

COMBINED CYCLE PLANT AND METHOD FOR OPERATING SAME

TECHNICAL FIELD

The present invention relates to a combined cycle plant including a gas turbine, a heat recovery steam generator, and a steam turbine, and a method for operating a combined cycle plant.

BACKGROUND ART

In combined cycle power generation, first, a gas turbine is driven by using natural gas or the like as a fuel, next, a heat recovery steam generator recovers flue gas of the gas turbine to generate steam, and a steam turbine is driven by the steam to generate electric power in a combined cycle. A combined cycle plant is a power generation plant that performs the combined cycle power generation.

There is known a technique where in the steam turbine of the combined cycle plant, in order to prevent steam inside the turbine from leaking to a gland portion or prevent outside air from infiltrating into the turbine from the gland portion, the steam is supplied to the gland portion to perform sealing. During operation of the steam turbine, after the temperature of the steam is reduced by a temperature reducer, the steam is supplied to a gland portion of a low-pressure turbine to perform sealing. In this case, the temperature reducer sprays a part of a condensate discharged from a condensate pump of a condenser onto the steam to reduce the temperature.

Such a combined cycle plant is described, for example, in PTL 1 below.

CITATION LIST

Patent Literature

[PTL 1] Japanese Unexamined Patent Application Publication. No. 63-167003

SUMMARY OF INVENTION

Technical Problem

As described above, in the related art, the temperature reducer sprays a part of the condensate as temperature-reducing water onto the steam to reduce the temperature and supply the steam reduced in temperature to the gland portion of the low-pressure turbine. For this reason, heat is not sufficiently recovered from the steam, which is uneconomical.

The invention solves the above problem, and an object at the invention is to provide a combined cycle plant and a method for operating the same that recovers heat from gland steam to improve the efficiency of a steam turbine.

Solution to Problem

In order to achieve the above object, according to the invention, there is provided a combined cycle plant including: a gas turbine including a compressor, a combustor, and a turbine; a heat recovery steam generator that uses waste heat of flue gas from the gas turbine to generate steam; a steam turbine including a high-pressure turbine and a low-pressure turbine that are driven by the steam generated by the heat recovery steam generator; a low-pressure gland steam line that supplies the steam to a low-pressure gland portion of the low-pressure turbine; and a first heat exchange part that performs heat exchange between the steam flowing through the low-pressure gland steam line and fuel gas to be supplied to the combustor.

Therefore, the steam is supplied to the low-pressure gland portion of the low-pressure turbine via the low-pressure gland steam line. At this time, in the first heat exchange part, the steam flowing through the low-pressure gland steam line exchanges heat with the fuel gas to be supplied to the combustor, so that the fuel gas is heated to be supplied to the combustor and the steam is reduced in temperature to be supplied to the low-pressure gland portion. For this reason, the heat of the steam is recovered by the fuel gas, and thus the efficiency of the combined cycle plant can be improved.

In the combined cycle plant according to the invention, a second heat exchange part that performs heat exchange between water heated by the heat recovery steam generator and the fuel gas is provided, and the first heat exchange part performs heat exchange between the fuel gas having exchanged heat with the water in the second heat exchange part and the steam flowing through the low-pressure gland steam line.

Therefore, the fuel gas is heated in the second heat exchange part by the water heated by the heat recovery steam generator and is heated in the first heat exchange part by the steam at higher temperature than the water, and thus the recovery of heat to the fuel gas can be efficiently performed.

In the combined cycle plant according to the invention, a third heat exchange part that performs heat exchange between the water subjected to heat exchange is the second heat exchange part and the steam flowing through the low-pressure gland steam line is provided.

Therefore, the steam heats the fuel gas in the first heat exchange part to be reduced in temperature and then heats the water at higher temperature than the fuel gas in the third heat exchange part to be reduced in temperature, and thus the heat of the steam can be efficiently recovered.

In the combined cycle plant according to the invention, a third heat exchange part that performs heat exchange between water heated by the heat recovery steam generator and the steam subjected to neat exchange in the first heat exchange part is provided.

Therefore, the steam is reduced in temperature by the first heat exchange part and then heats the water at higher temperature than the fuel gas in the third heat exchange part to be reduced in temperature, and thus the heat of the steam can be efficiently recovered.

In the combined cycle plant according to the invention, the low-pressure gland steam line includes a first low-pressure gland steam line provided with a temperature reducer that supplies temperature-reducing water to reduce a temperature of the steam, and a second low-pressure gland steam line provided with the first heat exchange part, and a supply destination of the steam is switchable between the first low-pressure gland steam line and the second low-pressure gland steam line.

Therefore, during start-up, the supply destination of the steam is switched to the first low-pressure gland steam line, so that the temperature of the steam is reduced by the temperature reducer, and during rated operation, the supply destination of the steam is switched to the second low-pressure gland steam line, so that the temperature of the steam is reduced by the first heat exchange part, and thus the steam at proper temperature can be always supplied to the low-pressure gland portion.

In the combined cycle plant according to the invention, a condenser that cools the steam having driven the low-pressure turbine is provided, and a makeup water supply line supplying makeup water to the temperature reducer from a feed water source that supplies the makeup water to the condenser is provided.

Therefore, since the makeup water to be supplied to the condenser is supplied to the temperature reducer via the makeup water supply line to be reduced in temperature, when seawater is used in the condenser as cooling water that cools the steam, even if the seawater enters the condenser, the seawater is not mixed with the gland steam and supplied to the low-pressure gland portion, and the plant can be continuously operated without being stopped, and thus the reliability can be improved.

In the combined cycle plant according to the invention, a third low-pressure gland steam line that supplies a part of the steam, which is subjected to heat exchange in the first heat exchange part, from the low-pressure gland steam line to the low-pressure turbine is provided, and the third low-pressure gland steam line is provided with an opening-closing valve.

Therefore, when the steam supplied to the low-pressure gland portion is surplus, the opening-closing valve is opened to supply the steam from the third low-pressure gland steam line to the low-pressure turbine, and thus the heat of the steam can be also recovered in the low-pressure turbine.

In addition, according to the invention, there is provided a method for operating a combined cycle plant including a gas turbine including a compressor, a combustor, and a turbine, a heat recovery steam generator that uses waste heat of flue gas from the gas turbine to generate steam, and a steam turbine including a high-pressure turbine and a low-pressure turbine that are driven by the steam generated by the heat recovery steam generator, the method including: a heat exchange step of performing heat exchange between the steam to be supplied to a low-pressure gland portion of the low-pressure turbine and fuel gas to be supplied to the combustor; and a supply step of supplying the steam, which has exchanged heat with the fuel gas, to the low-pressure gland portion of the low-pressure turbine.

Therefore, the fuel gas to be supplied to the combustor is heated by the steam to be supplied to the low-pressure gland portion, and the steam reduced in temperature is supplied to the low-pressure gland portion of the low-pressure turbine. For this reason, the heat of the steam is recovered by the fuel gas, and thus the efficiency of the steam turbine can be improved.

In the method for operating a combined cycle plant according to invention, in the heat exchange step heat is exchanged between the steam having leaked from a shaft end portion of the high-pressure turbine and the fuel gas to be supplied to the combustor.

Therefore, heat that is contained in the steam having leaked from the shaft end portion of the high-pressure turbine can be easily recovered.

In the method for operating a combined cycle plant according to the invention, the supply step includes a first supply step of supplying the steam, which is subjected to heat exchange in the heat exchange step, to the low-pressure gland portion and a second supply step of supplying auxiliary steam, which is reduced in temperature by temperature-reducing water, to the low-pressure gland portion, and the supply step is switched between the first supply step and the second supply step according to an operating state of the steam turbine.

Therefore, the supply step is switched between the first supply step and the second supply step according to the operating state, and thus the steam at a predetermined temperature can be always supplied to the low-pressure gland portion.

In the method for operating a combined cycle plant according to the invention, the first supply step is carried out in an operating region from start-up to a low load, and the second supply step is carried out during rated operation.

Therefore, regardless of the operating state, the steam at the predetermined temperature can be supplied to the low-pressure gland portion.

Advantageous Effects of Invention

According to the combined cycle plant and the method for operating the same of the invention, the heat of the gland steam is recovered, and thus the efficiency of the steam turbine can be improved.

DESCRIPTION OF EMBODIMENTS

Hereinafter, an exemplary embodiment of a combined cycle plant and a method for operating the same according to the invention will be described in detail with reference to the accompanying drawings. Incidentally, the invention is not limited by the embodiment, and when there are a plurality of embodiments, the invention also includes a configuration where the embodiments are combined.

Figure 1:
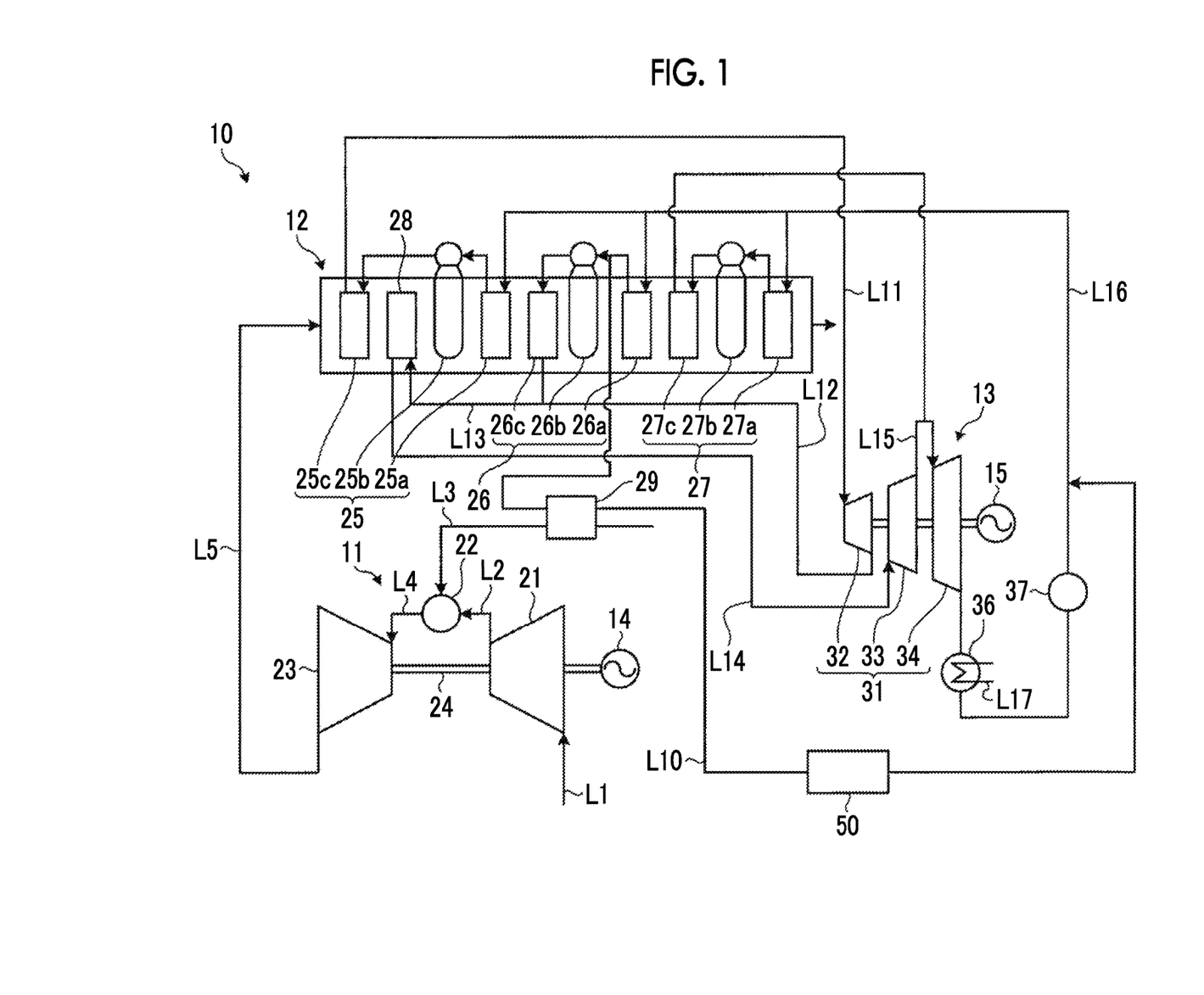
FIG. 1 is a schematic configuration diagram illustrating a combined cycle plant of the present embodiment.

FIG. 1 is a schematic configuration diagram illustrating the combined cycle plant of the present embodiment.

In the present embodiment, as illustrated in FIG. 1, a combined cycle plant 10 includes a gas turbine 11, a heat recovery steam generator (HRSG) 12, a steam turbine 13, and generators 14 and 15.

The gas turbine 11 includes a compressor 21, combustor 22, and a turbine 23. The compressor 21 and the turbine 23 are integrally rotatable coupled by a rotary shaft 24, and the generator 14 is coupled to the rotary shaft 24. The compressor 21 compresses air suctioned from an air intake line L1. The combustor 22 mixes the compressed air supplied from the compressor 21 through a compressed air supply line L2 and fuel gas supplied from a fuel gas supply line L3 to burn the mixed air and fuel gas. The turbine 23 is rotationally driven by combustion gas supplied from the combustor 22 through a combustion gas supply line L4. The generator 14 uses a rotational force, which is transmitted when the turbine 23 rotates, to generate electric power.

The heat recovery steam generator 12 uses waste heat of flue gas, which is discharged from the gas turbine 11 (turbine 23) via a flue gas discharge line L5, to generate steam. The heat recovery steam generator 12 includes a high-pressure unit 25, a medium-pressure unit 26, a low-pressure unit 27, and a reheater 28. In the heat recovery steam generator 12, the flue gas from the gas turbine 11 flows upstream thereinside, and thus the high-pressure unit 25, the medium-pressure unit 26, and the low-pressure unit 27 sequentially recovers heat to generate steam.

The high-pressure unit 25 includes a high-pressure economizer a high-pressure evaporator 25b, and a high-pressure superheater 25c. After feed water is heated by the high-pressure economizer 25a, the feed water is delivered to the high-pressure evaporator 25b via a first high-pressure steam line to be heated here to generate high-pressure steam, and the high-pressure steam is delivered to the high-pressure superheater 25c via a second high-pressure steam line to be superheated. The medium-pressure unit includes a medium-pressure economizer 26a, a medium-pressure evaporator 26b, and a medium-pressure superheater 26c. For this reason, after feed water is heated by the medium-pressure economizer 26a, the feed water is delivered to the medium-pressure evaporator 26b via a first medium-pressure steam line to be heated here to generate medium-pressure steam, and the medium-pressure steam is delivered to the medium-pressure superheater 26c via a second medium-pressure steam line to be superheated. In addition, the feed water heated by the medium-pressure economizer 26a is supplied to heater 29 via a medium-pressure feed water line L10 branched from the second medium-pressure steam line. The low-pressure unit 27 includes a low-pressure economizer 27a, a low-pressure evaporator 27b, and a low-pressure superheater 27c. For this reason, after feed water heated by the low-pressure economizer 27a, the feed water is delivered to the low-pressure evaporator 27b via a first low-pressure steam line to be heated here to generate low-pressure steam, and the low-pressure steam is delivered to the low-pressure superheater 27c via a second low-pressure steam line to be superheated.

The steam turbine 13 driven by the superheated steam generated by the heat recovery steam generator 12, and includes a turbine 31. In the turbine 31, a high-pressure turbine 32, a medium-pressure turbine 33, and a low-pressure turbine 34 are integrally rotatably coupled by a rotary shaft 35, and the generator 15 is coupled to the rotary shaft 35. The steam turbine 13 is provided with a condenser 36 that cools steam having driven the low-pressure turbine 34. The condenser 36 cools the steam, which is discharged from the low-pressure turbine 34, with cooling water (for example, seawater) to generate a condensate.

The high-pressure steam of the high-pressure superheater 25c is supplied to the high-pressure turbine via a high-pressure steam supply line L11, and the high-pressure steam discharged from the high-pressure turbine 32 returns to the reheater 28 via a high-pressure steam recovery line L12. The medium-pressure steam of the medium-pressure superheater 26c is supplied to the reheater 28 via a first high-pressure steam supply line L13. The medium-pressure steam superheated by the reheater 28 is supplied to the medium-pressure turbine 33 via a second medium-pressure steam supply line L14, and the medium-pressure steam discharged from the medium-pressure turbine 33 is supplied to the low-pressure turbine 34 via a medium-pressure steam supply line L15. The generator 15 uses a rotational force, which is transmitted when the turbine 31 rotates, to generate electric power. In addition, the condenser 36 delivers the generated condensate to the economizers 25a, 26a, and 27a of the heat recovery steam generator 12 via a condensate supply line L16. The condensate supply line L16 is provided with a condensate pump 37. In addition, the condenser 36 is provided with a cooling water line L17 that cools steam with seawater. Meanwhile, the heat recovery steam generator 12 is coupled to a stack (unillustrated) via a flue gas discharge line L6 that discharges the flue gas used to generate steam.

For this reason, when the combined cycle plant 10 is in operation, in the gas turbine 11, the compressor 21 compresses air and the combustor 22 mixes the supplied compressed air and fuel gas to burn the mixed air and fuel gas. The turbine 23 is rotationally driven by combustion gas supplied from the combustor 22, so that the generator generates electric power. In addition, the flue gas discharged from the gas turbine 11 (turbine 23) is delivered to the heat recovery steam generator 12, the heat recovery steam generator 12 generates steam, and the superheated steam is delivered to the steam turbine 13. The high-pressure turbine 32, the medium-pressure turbine 33, and the low-pressure turbine 34 are rotationally driven by the superheated steam, so that the generator 15 generates electric power. The steam used in the low-pressure turbine 34 is cooled by the condenser 36 to become a condensate, and the condensate returns to the heat recovery steam generator 12.

Figure 2:
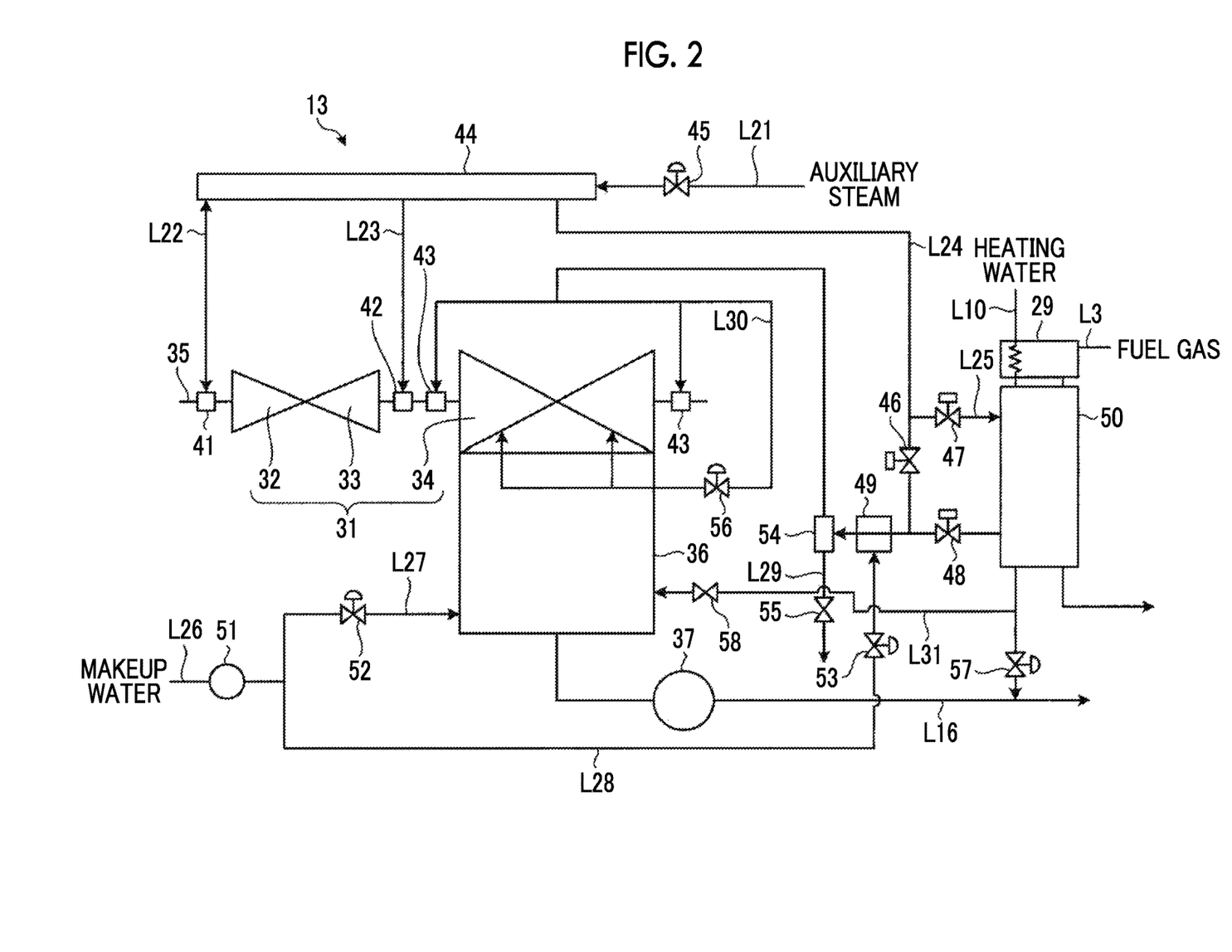
FIG. 2 is a schematic diagram illustrating a gland steam supply system in a steam turbine.
Figure 3:
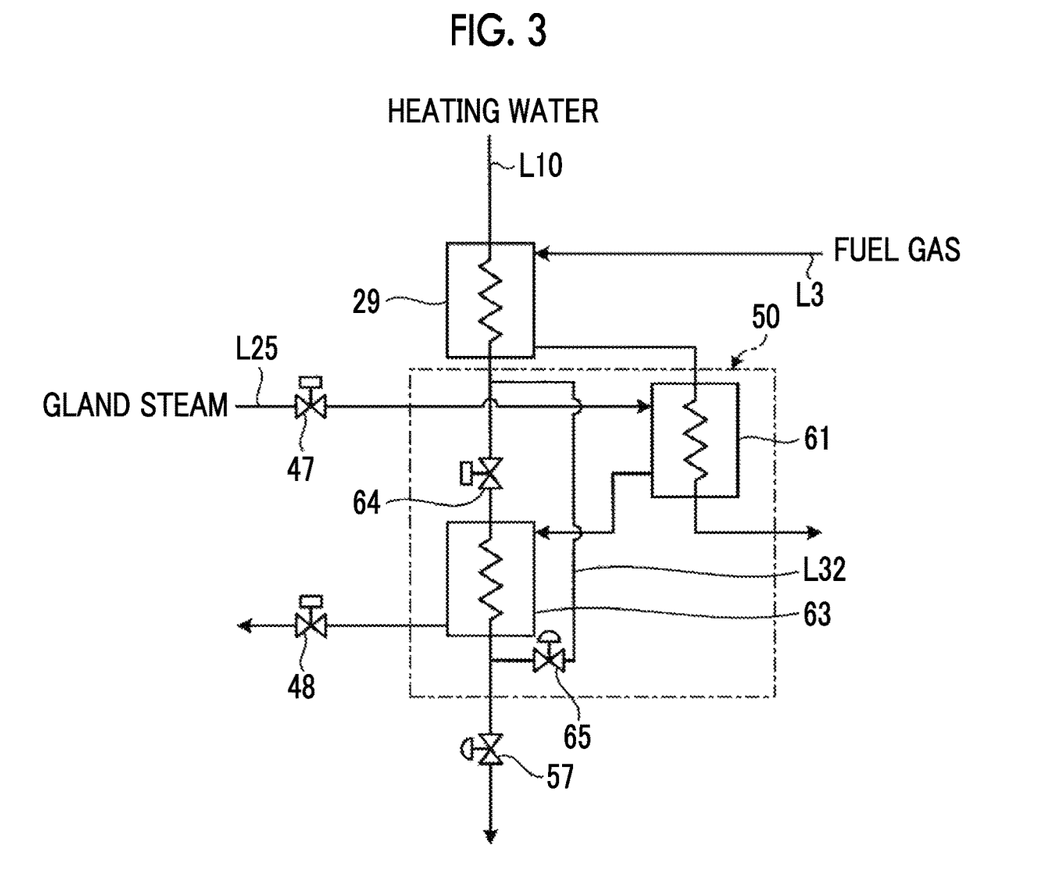
FIG. 3 is a schematic diagram illustrating a heat exchanger for gland steam.

FIG. 2 is a schematic diagram illustrating a gland steam supply system in the steam turbine, and FIG. 3 is a schematic diagram illustrating a heat exchanger for gland steam. Incidentally, in the following description, the gland steam is sealing steam that is supplied to a gland portion of the steam turbine 13.

As illustrated in FIG. 2, in the steam turbine 13, the high-pressure turbine 32, the medium-pressure turbine 33, and the low-pressure turbine 34 are coaxially coupled by the rotary shaft 35. The high-pressure turbine 32 is provided with a high-pressure gland portion 41 that is an end portion between the rotary shaft 35 and a casing, the medium-pressure turbine is provided with a medium-pressure gland portion 42 that is an end portion between the rotary shaft 35 and a casing, and the low-pressure turbine 34 is provided with a low-pressure gland portion 43 that is an end portion between the rotary shaft 35 and a casing.

An auxiliary steam supply line L21 is coupled to a header 44 that stores steam, and the auxiliary steam supply line L21 is provided with a pressure control valve 45. A high-pressure gland steam line L22 is provided between the header 44 and the high-pressure gland portion 41. The header 44 supplies auxiliary steam from the auxiliary steam supply line L21, the auxiliary steam being generated by an auxiliary boiler, and leak steam from the high-pressure gland steam line L22. In addition, a medium-pressure gland steam line L23 is provided between the header 44 and the medium-pressure gland portion 42, and a low-pressure gland steam line L24 is provided between the header 44 and the low-pressure gland portion 43. A low-pressure gland steam branch line L25 is provided in a middle portion of the low-pressure gland steam line L24. Then, the low-pressure gland steam line L24 provided with a first switching valve 46, and the low-pressure gland steam branch line L25 is provided with a second switching valve 47 and a third switching valve 48.

The low-pressure gland steam line L24 is provided with a temperature reducer 49 downstream of the first switching valve 46, and the low-pressure gland steam branch line L25 is provided with a heat exchanger 50 between the second switching valve 47 and the third switching valve 48. Here, the low-pressure gland steam line L24 is a first low-pressure gland steam line of the invention, the low-pressure gland steam ranch line L25 is a second low-pressure gland steam line of the invention, and the low-pressure gland steam line L24 and the low-pressure gland steam branch line L25 are disposed in parallel to each other. Namely, when the first switching valve 46 is opened and the second switching valve 47 and the third switching valve 48 are closed, the gland steam of the header 44 flows through the low-pressure gland steam line L24 as it is to pass through the temperature reducer 49. Meanwhile, when the first switching valve 46 is closed and the second switching valve 47 and the third switching valve 48 are opened, the gland steam of the header 44 flows through the low-pressure gland steam branch line L25 from the low-pressure gland steam line L24 to pass through the heat exchanger 50.

The temperature reducer 49 supplies makeup water (pure water) as temperature-reducing water to reduce the temperature of the gland steam. A makeup water supply line L26 from a makeup water tank (feed water source) (unillustrated) is provided with a makeup water pump 51 and is branched into a first makeup water supply line L27 and a second makeup water supply line L28. The first makeup water supply line L27 is coupled to the condenser 36 and is provided with an opening-closing valve 52, and the second makeup water supply line L28 is coupled to the temperature reducer 49 and is provided with an opening-closing valve 53. A part of the makeup water to be supplied to the condenser 36 is supplied to the temperature reducer 49, and the temperature reducer 49 sprays the makeup water onto the gland steam to reduce the temperature of the gland steam. The gland steam that is reduced in temperature by the temperature reducer 49 is supplied to the low-pressure gland portion 43 via the low-pressure gland steam line L24. Incidentally, the low-pressure gland steam line L24 is provided with a steam-liquid separator 54 downstream of the temperature reducer 49, a drain line L29 is coupled to the steam-liquid separator 54, and the drain line L29 is provided with an opening-closing valve 55.

In addition, the low-pressure gland steam line L24 is provided with a low-pressure gland steam branch line L30 that is branched downstream of the temperature reducer and the steam-liquid separator 54. The low-pressure gland steam branch line L30 is provided with a spillover valve (opening-closing valve) 56 and is coupled to a middle stage or latter stage of the low-pressure turbine 34. The low-pressure gland steam branch line L30 supplies excess gland steam, which flows through the low-pressure gland steam line L24, to the low-pressure turbine 34.

The heat exchanger 50 performs heat exchange between the gland steam flowing through the low-pressure gland steam branch line L25, the fuel gas flowing through the fuel gas supply line L3, and medium-pressure feed water (heating water) that is heated by the heat recovery steam generator 12 to flow through the medium-pressure feed water line L10. A base end portion on an upstream side of the medium-pressure feed water line L10 is branched from a system downstream of the medium-pressure economizer 26a, and a tip portion on a downstream side thereof is coupled to the condensate supply line L16 and is provided with an opening-closing valve 57. Incidentally, the medium-pressure feed water line L10 is provided with a feed water recovery line L31 leading from between the heat exchanger 50 and the opening-closing valve 57 toward the condenser 36, and the feed water recovery line L31 is provided with an opening-closing valve 58.

As illustrated in FIG. 3, the heat exchanger 50 includes a first heat exchange part 61 and a third heat exchange part 63. The first heat exchange part 61 performs heat exchange between the gland steam flowing through the low-pressure gland steam branch line L25 and the fuel gas flowing through the fuel gas supply line L3. The third heat exchange part 63 performs heat exchange between the gland steam flowing through the low-pressure gland steam branch line L25 and the medium-pressure feed water flowing through the medium-pressure feed water line L10. Incidentally, the fuel heater 29 as a second heat exchange part performs heat exchange between the medium-pressure feed water flowing through the medium-pressure feed water line L10 and the fuel gas flowing through the fuel gas supply line L3. In the present embodiment, the first heat exchange part 61 and the third heat exchange part 63 form the heat exchanger 50 as one unit; however, the first heat exchange part 61, a second heat exchange part 62, and the third heat exchange part 63 may form a heat exchanger as one unit.

In addition, the medium-pressure feed water line L10 is provided with a bypass line L32 that bypasses the third heat exchange part 63. Then, the medium-pressure feed water line L10 is provided with a switching valve 64 between a branching portion of the bypass line L32 and the third heat exchange part 63, and the bypass line L32 is provided with a switching valve 65.

For this reason, in the heat exchanger 50, first, in the second heat exchange part 62, the fuel gas flowing through the fuel gas supply line L3 is heated by the medium-pressure feed water flowing through the medium-pressure feed water line L10. Next, in the first heat exchange part 61, the fuel gas flowing through the fuel gas supply line L3 is further heated by the gland steam flowing through the low-pressure gland steam branch line L25. Finally, in the third heat exchange part 63, the medium-pressure feed water flowing through the medium-pressure feed water line L10 is heated by the gland steam flowing through the low-pressure gland steam branch line L25. As a result, the heat of the gland steam is recovered by the fuel gas and the medium-pressure feed water, so that the temperature of the gland steam is reduced.

Figure 4:
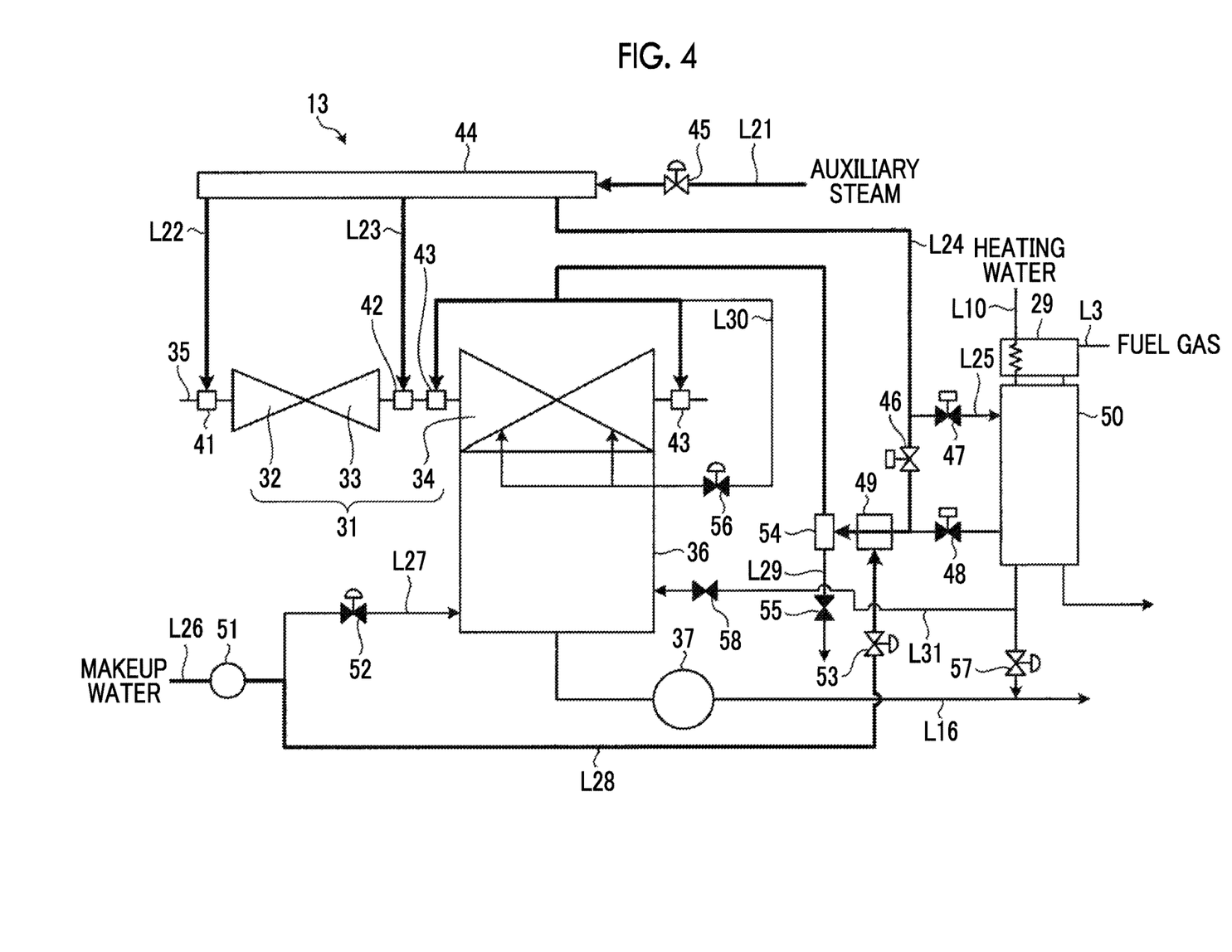
FIG. 4 is a schematic diagram illustrating the gland steam supply system during start-up of the combined cycle plant.
Figure 5:
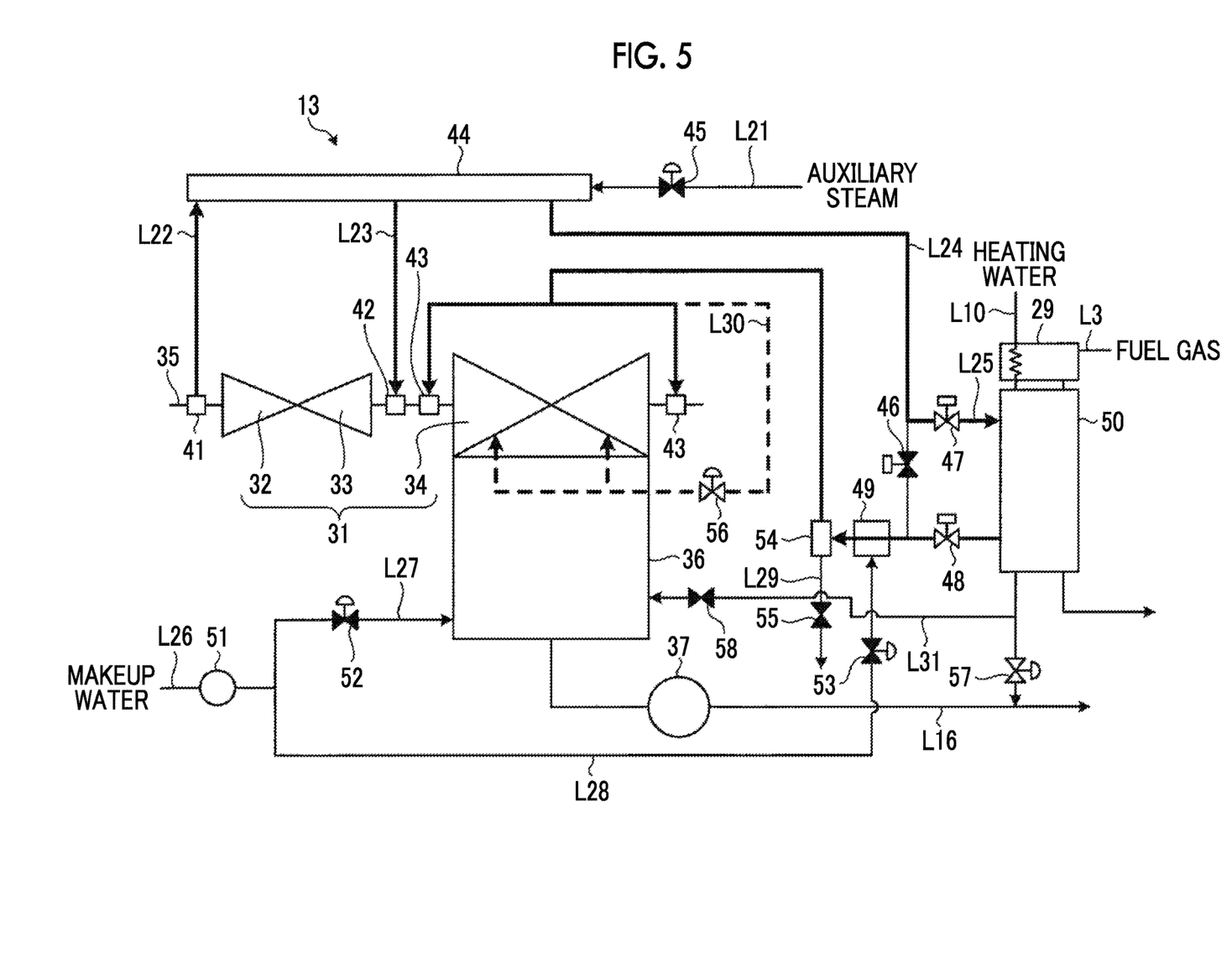
FIG. 5 is a schematic diagram illustrating the gland steam supply system during load operation of the combined cycle plant.

Here, a method for operating the combined cycle plant 10 will be described in detail. FIG. 4 is a schematic diagram illustrating the gland steam supply system during start-up of the combined cycle plant, and FIG. 5 is a schematic diagram illustrating the gland steam supply system during load operation of the combined cycle plant. Incidentally, each temperature to be described below is an example.

In the method for operating a combined cycle plant according to the present embodiment, during start-up, auxiliary steam is used as the gland steam, the auxiliary steam is reduced in temperature by the temperature reducer 49 to be supplied to the low-pressure gland portion 43, whereas during rated operation, heat is exchanged between gland steam, which has leaked from a shaft end portion of the high-pressure turbine 32, and the fuel gas and the medium-pressure feed water to reduce the temperature of the gland steam, and the gland steam reduced in temperature is supplied to the low-pressure gland portion 43.

Namely, during start-up of the combined cycle plant 10, as illustrated in FIG. 4, since the steam turbine 13 is not started up, gland steam does not leak from the high-pressure gland portion 41 of the high-pressure turbine 32 to the high-pressure gland steam line L22. For this reason, the pressure control valve 45 is opened, and the auxiliary steam is supplied from the auxiliary steam supply line L21 to the header 44. Then, as the gland steam, the auxiliary steam of the header 44 is supplied from the high-pressure gland steam line L22 to the high-pressure gland portion 41, is supplied from the medium-pressure gland steam line L23 to the medium-pressure gland portion 42, and is supplied from the low-pressure gland steam line L24 to the low-pressure gland portion 43.

At this time, since the temperature of the auxiliary steam supplied to the header 44 is as high as approximately 350°

C., the temperature of the gland steam supplied to the low-pressure gland portion 43 is required to be reduced. For this reason, the first switching valve 46 is opened, the second switching valve 47 and the third switching valve 48 are closed, so that a line which supplies the gland steam to the low-pressure gland portion 43 is the low-pressure gland steam line L24, and the low-pressure gland steam branch line L25 is closed. In addition, the opening-closing valve 52 is closed, the opening-closing valve 53 is opened, and the makeup water pump 51 is driven to supply the makeup water from the makeup water supply line L26 and the second makeup water supply line L28 to the temperature reducer 49, so that the temperature reducer 49 is operated.

Then, the auxiliary steam of the header 44 flows through the low-pressure gland steam line L24 as the gland steam, the temperature reducer 49 sprays the makeup water onto the auxiliary steam to reduce the temperature to approximately 150° C., and the gland steam reduced in temperature is supplied to the low-pressure gland portion 43. Incidentally, at this time, since the gland steam is not supplied to the heat exchanger 50, as illustrated in FIG. 3, the switching valve 64 is closed, the switching valve 65 is opened, and the opening-closing valve 57 is opened, so that the medium-pressure feed water flowing through the medium-pressure feed water line L10 bypasses the third heat exchange part 63.

Thereafter, as illustrated in FIG. 1, the rotation speed of the gas turbine 11 rises to a rated rotation speed, the heat recovery steam generator 12 uses flue gas to generate steam, and the operation of the steam turbine 13 is started, so that the combined cycle plant 10 is in rated operation.

During rated operation of the combined cycle plant 10, as illustrated in FIG. 5, since the steam turbine 13 operates, leak steam is supplied from the high-pressure gland portion 41 of the high-pressure turbine 32 to the high-pressure gland steam line L22. For this reason, the pressure control valve 45 is closed and the supply of auxiliary steam to the header 44 is stopped. Then, the gland steam supplied from the high-pressure gland portion 41 to the high-pressure gland steam line L22 is supplied from the high-pressure gland steam line L22 to the header 44, and the gland steam of the header 44 is supplied from the medium-pressure gland steam line L23 to the medium-pressure gland portion 42 and is supplied from the low-pressure gland steam line L24 to the low-pressure gland portion 43.

At this time, the first switching valve 46 is closed, the second switching valve 47 and the third switching valve 48 are opened, and a line which supplies the gland steam to the low-pressure gland portion 43 is the low-pressure gland steam branch line L25. In addition, the opening-closing valves 52 and 53 are closed and the driving of the makeup water pump 51 is stopped, so that the supply of the makeup water to the temperature reducer 49 is stopped and the operation of the temperature reducer 49 is stopped. Then, the gland steam of the header 44 flows from the low-pressure gland steam line L24 to the low-pressure gland steam branch line L25 to exchange heat with the fuel gas and the medium-pressure feed water in the heat exchanger 50, so that the temperature of the gland steam is reduced to 150° C., and the gland steam reduced in temperature is supplied from the low-pressure gland steam line L24 to the low-pressure gland portion 43. Incidentally, at this time, since the gland steam is supplied to the heat exchanger 50, as illustrated in FIG. 3, the switching valve 64 is opened and the switching valve 65 is closed.

Namely, first, in the second heat exchange part 62, the fuel gas at room temperature flowing through the fuel gas supply line L3 exchanges heat with the medium-pressure feed water (for example, 250° C.) flowing through the medium-pressure feed water line L10, so that the fuel gas is heated to, for example, 230° C. and the temperature of the medium-pressure feed water is reduced to, for example, 100° C. Next, in the first heat exchange part 61, the fuel gas at 230° C. exchanges heat with the gland steam at 350° C. flowing through the low-pressure gland steam branch line L25, so that the fuel gas is heated to, for example, 250° C. and the temperature of the gland steam is reduced to, for example, 250° C. Finally, in the third heat exchange part 63, the gland steam at 250° C. exchanges heat with the medium-pressure feed water at 100° C. flowing through the medium-pressure feed water line L10, so that the temperature of the gland steam is reduced to, for example, 150° C. and the medium-pressure feed water is heated to, for example, 120° C.

For this reason, as illustrated in FIG. 5, the heat of the gland steam at 350° C. is recovered by the fuel gas and the medium-pressure feed water in the heat exchanger 50, so that the temperature of the gland steam is reduced to 150° C., which is proper temperature, and the gland steam is supplied from the low-pressure gland steam line L24 to the low-pressure gland portion 43. At this time, since the operation of the temperature reducer 49 is stopped, the temperature of the gland steam at 150° C. is not further reduced.

In addition, the gland steam leaking from the high-pressure gland portion 41 to the high-pressure gland steam line L22 is excessive, and even if the gland steam is supplied to the gland portions 41, 42, and 43, the gland steam may be surplus. At this time, the spillover valve 56 releases steam having a certain pressure or higher, and thus while the steam pressure of the low-pressure gland steam line L24 is maintained at the certain pressure, a part (surplus amount) of the gland steam flowing through the low-pressure gland steam line L24 flows to the low-pressure gland steam branch line L30. Then, the surplus gland steam is supplied from the low-pressure gland steam branch line L30 to the middle stage or latter stage of the low-pressure turbine 34, and the heat of the surplus gland steam is recovered here.

Figure 6:
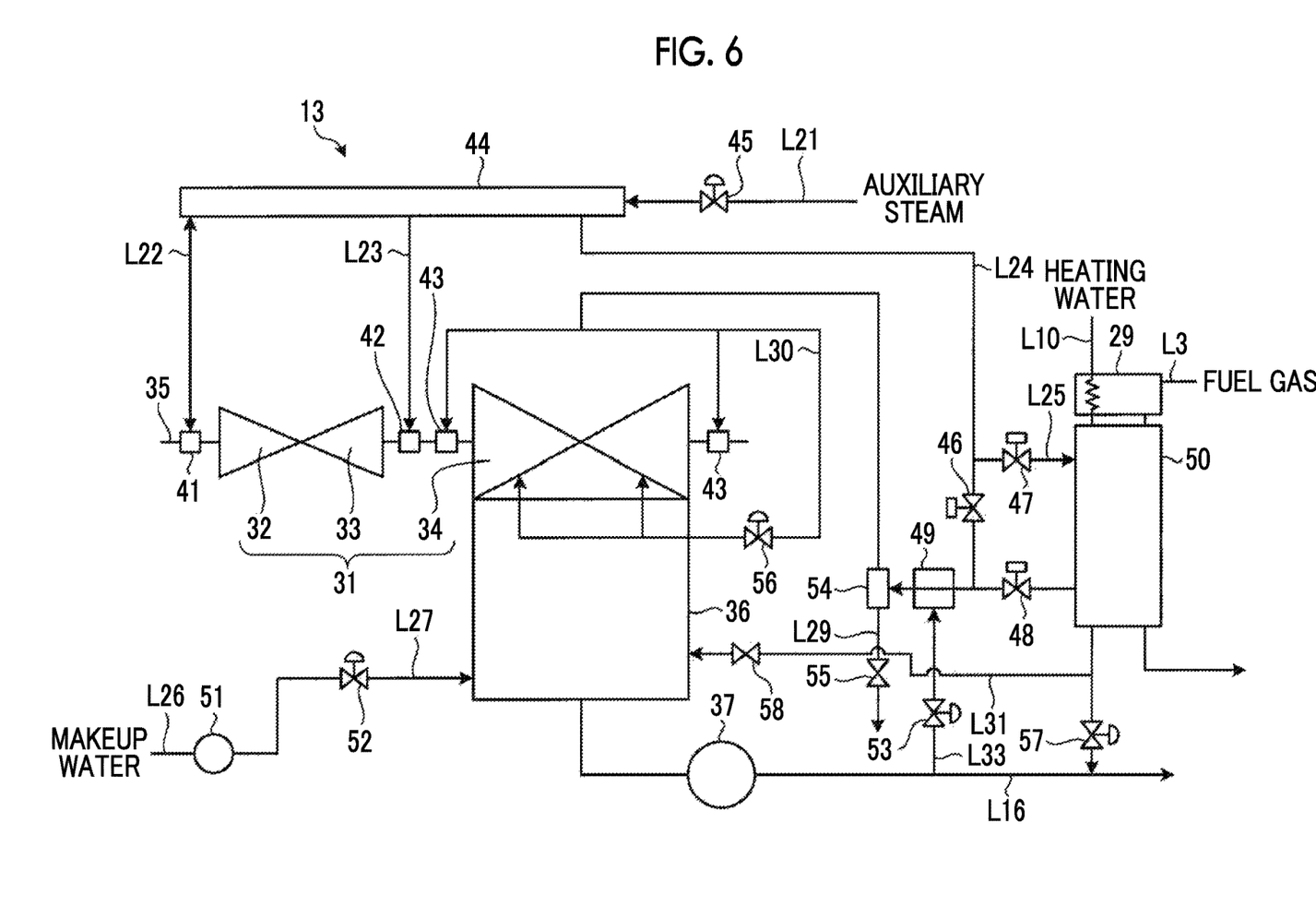
FIG. 6 is a schematic diagram illustrating a modified example of the gland steam supply system in the steam turbine.

Incidentally, in the above description, a part of the makeup water to be supplied to the condenser 36 is supplied to the temperature reducer 49, and the temperature reducer 49 sprays the makeup water onto the gland steam to reduce the temperature of the gland steam, but is not limited to this configuration. FIG. 6 is a schematic diagram illustrating a modified example of the gland steam supply system in the steam turbine.

As illustrated in FIG. 6, the temperature reducer 49 supplies feed water (condensate) as the temperature-reducing water to reduce the temperature of the gland steam. The condenser 36 is provided with the condensate supply line L16 that causes the condensate to return to the heat recovery steam generator 12, and the condensate supply line L16 is provided with the condensate pump 37. A feed water supply line L33 is provided with the opening-closing valve 53 of which a base end portion is coupled downstream of the condensate pump 37 in the condensate supply line L16 and of which a tip portion is coupled to the temperature reducer 49. A part of the condensate of the condenser 36 is supplied to the temperature reducer 49, and the temperature reducer 49 sprays the condensate onto the gland steam to reduce the temperature of the gland steam. The gland steam that is reduced in temperature by the temperature reducer 49 is supplied to the low-pressure gland portion 43 via the low-pressure gland steam line L24.

As described above, the combined cycle plant of the present embodiment is provided with the gas turbine 11, the heat recovery steam generator 12, and the steam turbine 13, and is provided with the low-pressure gland steam line L24 that supplies the gland steam to the low-pressure gland portion 43 of the low-pressure turbine 34, and the heat exchanger 50 (first heat exchange part 61) that performs heat exchange between the gland steam flowing through the low-pressure gland steam line L24 and the fuel gas to be supplied to the combustor 22.

Therefore, in the first heat exchange part 61 of the heat exchanger 50, the gland steam to be supplied to the low-pressure gland portion 43 exchanges with heat the fuel gas supplied to the combustor 22 to be reduced in temperature, and thus the gland steam at proper temperature can be supplied to the low-pressure gland portion 43 and meanwhile, the fuel gas can be increased in temperature to be supplied to the combustor 22. As a result, the heat of the gland steam can be recovered by the fuel gas, and thus the efficiency of the steam turbine 13 can be improved.

In the combined cycle plant of the present embodiment, the second heat exchange part 62 that performs heat exchange between the medium-pressure feed water heated by the heat recovery steam generator and the fuel gas is provided, and the first heat exchange part 61 performs heat exchange between the fuel gas having exchanged heat with the medium-pressure feed water in the second heat exchange part 62 and the gland steam. Therefore, the fuel gas is heated by the medium-pressure feed water in the second heat exchange part 62 and then is heated in the first heat exchange part 61 by the gland steam at higher temperature than the medium-pressure feed water, and thus the recovery of heat to the fuel gas can be efficiently performed.

The combined cycle plant of the present embodiment is provided with the third heat exchange part 63 that performs heat exchange between the medium-pressure feed water subjected to heat exchange in the second heat exchange part 62 and the gland steam. Therefore, the gland steam heats the fuel gas in the first heat exchange part 61 to be reduced in temperature and then heats the medium-pressure feed water at higher temperature than the fuel gas in the third heat exchange part 63 to be reduced in temperature, and thus the heat of the gland steam can be efficiently recovered.

In the combined cycle plant of the present embodiment, the third heat exchange part 63 performs heat exchange between the medium-pressure feed water heated by the heat recovery steam generator 12 and the gland steam subjected to heat exchange in the first heat exchange part 61. Therefore, the gland steam is reduced in temperature by the first heat exchange part and then heats the medium-pressure feed water at higher temperature than the fuel gas in the third heat exchange part 63 to be reduced in temperature, and thus the heat of the gland steam can be efficiently recovered.

In the combined cycle plant of the present embodiment, the low-pressure gland steam line L24 provided with the temperature reducer 49 that supplies the makeup water to reduce the temperature of the gland steam and the low-pressure gland steam branch line L25 provided with the first heat exchange part 61 are provided, and the supply destination of the gland steam is switchable between the low-pressure gland steam line L24 and the low-pressure gland steam branch line L25. Therefore, during start-up, the supply destination of the gland steam is switched to the low-pressure gland steam line L24, so that the temperature of the gland steam is reduced by the temperature reducer 49, and during rated operation, the supply destination of the gland steam is switched to the low-pressure gland steam branch line L25, so that the temperature of the gland steam is reduced by the heat exchanger 50, and thus the gland steam at proper temperature can be always supplied to the low-pressure gland portion 43.

The combined cycle plant of the present embodiment is provided with the condenser 36 that cools the steam having driven the low-pressure turbine 34, and is provided with the second makeup water supply line L28 that supplies the makeup water to the temperature reducer 49 from the feed water source that supplies the makeup water to the condenser 36. Therefore, when seawater is used in the condenser 36 as cooling water that cools the steam, even if the seawater enters the condenser 36, the seawater is not mixed with the gland steam and supplied to the low-pressure gland portion 43, and the plant can be continuously operated without being stopped, and thus the reliability can be improved.

In the combined cycle plant of the present embodiment, the low-pressure gland steam branch line L30 that supplies a part of the gland steam, which is subjected to heat exchange in the heat exchanger 50, from the low-pressure gland steam line L24 to the low-pressure turbine 34 is provided, and the low-pressure gland steam branch line L30 is provided with the spillover valve 56. Therefore, when the gland steam supplied to the low-pressure gland portion 43 is surplus, the spillover valve 56 is opened to supply the gland steam from the low-pressure gland steam branch line L30 to the low-pressure turbine 34, and thus the heat of the gland steam can be also recovered in the low-pressure turbine 34.

In the related art, a surplus amount of the gland steam is discharged to the condenser 36 as it is without being reduced in temperature, and thus a pipe from the header 44 to the condenser 36 is required. Since high-pressure and high-temperature gland steam flows through the pipe, the pipe is required to have a large diameter pipe and a large space is required, and thus equipment cost is increased. In the present embodiment, after a surplus amount of the gland steam and the gland steam to be supplied to the low-pressure gland portion 43 are reduced in temperature by the heat exchanger 50, the surplus gland steam is supplied to the low-pressure turbine 34. Since the surplus gland steam has low pressure and low temperature, a pipe through which the gland steam flows can be reduced in diameter and a large space is not required, and thus an increase in equipment cost can be suppressed.

In addition, the method for operating a combined cycle plant according to the present embodiment includes a heat exchange step of performing heat exchange between steam to be supplied to the low-pressure gland portion 43 of the low-pressure turbine 34 and fuel gas to be supplied to the combustor 22, and a supply step of supplying gland steam, which has exchanged heat with the fuel gas, to the low-pressure gland portion 43 of the low-pressure turbine 34.

Therefore, the fuel gas to be supplied to the combustor 22 is heated by the gland steam to be supplied to the low-pressure gland portion 43, and the gland steam reduced in temperature is supplied to the low-pressure gland portion 43 of the low-pressure turbine 34. For this reason, the heat of the gland steam recovered by the fuel gas, and thus the efficiency of the steam turbine 13 can be improved.

In the method for operating a combined cycle plant according to the present embodiment, in the heat exchange step, heat is exchanged between steam having leaked from a shaft end portion of the high-pressure turbine 32 and the fuel gas to be supplied to the combustor 22. Therefore, heat that is contained in the steam having leaked from the shaft end portion of the high-pressure turbine 32 can be easily recovered.

In the method for operating a combined cycle plant according to the present embodiment, the supply step includes a first supply step or supplying the gland steam, which is subjected to heat exchange in the heat exchange step, to the low-pressure gland portion 43 and a second supply step of supplying auxiliary steam, which is reduced in temperature by temperature-reducing water, to the low-pressure gland portion 43 and the supply step is switched between the first supply step and the second supply step according to an operating state of the steam turbine 13. Therefore, the supply step is switched between the first supply step and the second supply step according to the operating state, and thus the steam at a predetermined temperature can be always supplied to the low-pressure gland portion.

In the method for operating a combined cycle plant according to the present embodiment, the first supply step is carried out in an operating region from start-up to a low load, and the second supply step is carried out during rated operation. Therefore, regardless of the operating state, the steam at the predetermined temperature can be supplied to the low-pressure gland portion 43.

Incidentally, in the embodiment described above, the heat exchanger 50 includes the first heat exchange part 61 and the third heat exchange part 63, and the heat exchange parts 61 and 63 are independently provided; however, the invention is not limited to this configuration. For example, the heat exchanger 50 may include the first heat exchange part 61, the second heat exchange part 62, and the third heat exchange part 63, and the first heat exchange part 61, the second heat exchange part 62, and the third heat exchange part 63 may be independently provided. In this case, since the gland steam exchanges heat with the fuel gas and the medium-pressure feed water, the first heat exchange part 61 and the second heat exchange part 62 may be integrally configured. In addition, the first heat exchange part 61, the second heat exchange part 62, and the third heat exchange part 63 may be integrated to form the heat exchanger. Furthermore, the third heat exchange part 63 may not be provided. The order of the heat exchange performed by the first heat exchange part 61 and the second heat exchange part 62 may be reversed.

REFERENCE SIGNS LIST

10: Combined cycle plant
11: Gas turbine
12: Heat recovery steam generator
13: Steam turbine
14, 15: Generator
21: Compressor
22: Combustor
23: Turbine
24: Rotary shaft
25: High-pressure unit
26: Medium-pressure unit
27: Low-pressure unit
28: Reheater
29: Fuel heater (second heat exchange part)
31: Turbine
32: High-pressure turbine
33: Medium-pressure turbine
34: Low-pressure turbine
35: Rotary shaft
36: Condenser
37: Condensate pump
41: High-pressure gland portion
42: Medium-pressure gland portion
43: Low-pressure gland portion
44: Header
45: Pressure control valve
46: First switching valve
47: Second switching valve
48: Third switching valve
49: Temperature reducer
50: Heat exchanger
51: Makeup water pump
56: Spillover valve (opening-closing valve)
61: First heat exchange part
63: Third heat exchange part
L3: Fuel gas supply line
L10: Medium-pressure feed water line
L21: Auxiliary steam supply line
L22: High-pressure gland steam line
L23: Medium-pressure gland steam line
L24: Low-pressure gland steam line (first low-pressure gland steam line)
L25: Low-pressure gland steam branch line (second low-pressure gland steam line)
L26: Makeup water supply line
L27: First makeup water supply line
L28: Second makeup water supply line
L30: Low-pressure gland steam branch line (third low-pressure gland steam line)

The invention claimed is:

1. A combined cycle plant comprising:
 a gas turbine including a compressor, a combustor, and a turbine;
 a heat recovery steam generator that uses waste heat of flue gas from the gas turbine to generate steam;
 a steam turbine including a high-pressure turbine and a low-pressure turbine that are driven by the steam generated by the heat recovery steam generator;
 a low-pressure gland steam line that supplies the steam to a low-pressure gland portion of the low-pressure turbine; and
 a first heat exchange part that performs heat exchange between the steam flowing through the low-pressure gland steam line and fuel gas to be supplied to the combustor.

2. The combined cycle plant according to claim 1, wherein a second heat exchange part that performs heat exchange between water heated by the heat recovery steam generator and the fuel gas is provided, and the first heat exchange part performs heat exchange between the fuel gas having exchanged heat with the water in the second heat exchange part and the steam flowing through the low-pressure gland steam line.

3. The combined cycle plant according to claim 2, wherein a third heat exchange part that performs heat exchange between the water subjected to heat exchange in the second heat exchange part and the steam flowing through the low-pressure gland steam line is provided.

4. The combined cycle plant according to claim 1, wherein a third heat exchange part that performs heat exchange between water heated by the heat recovery steam generator and the steam subjected to heat exchange in the first heat exchange part is provided.

5. The combined cycle plant according to claim 1, wherein the low-pressure gland steam line includes a first low-pressure gland steam line provided with a temperature reducer that supplies temperature-reducing water to reduce a temperature of the steam, and a second low-pressure gland steam line provided with the first heat exchange part, and a supply destination of the steam is switchable between the first low-pressure gland steam line and the second low-pressure gland steam line.

6. The combined cycle plant according to claim 5, wherein a condenser that cools the steam having driven the low-pressure turbine is provided, and a makeup water supply line supplying makeup water to the temperature reducer from a feed water source that supplies the makeup water to the condenser is provided.

7. The combined cycle plant according to claim 1, wherein a third low-pressure gland steam line that supplies a part of the steam, which is subjected to heat exchange in the first heat exchange part, from the low-pressure gland steam line to the low-pressure turbine is provided, and the third low-pressure gland steam line is provided with an opening-closing valve.

8. A combined cycle plant comprising:
a gas turbine including a compressor, a combustor, and a turbine;
a heat recovery steam generator that uses waste heat of flue gas from the gas turbine to generate steam;
a steam turbine including a high-pressure turbine and a low-pressure turbine that are driven by the steam generated by the heat recovery steam generator;
the method comprising:
a heat exchange step of performing heat exchange between the steam to be supplied to a low-pressure gland portion of the low-pressure turbine and fuel gas to be supplied to the combustor; and
a supply step of supplying the steam, which has exchanged heat with the fuel gas, to the low-pressure gland portion of the low-pressure turbine.

9. The method for operating a combined cycle plant according to claim 8, wherein in the heat exchange step, heat is exchanged between the steam having leaked from a shaft end portion of the high-pressure turbine and the fuel gas to be supplied to the combustor.

10. The method for operating a combined cycle plant according to claim 9, wherein the supply step includes a first supply step of supplying the steam, which is subjected to heat exchange in the heat exchange step, to the low-pressure gland portion and a second supply step of supplying auxiliary steam, which is reduced in temperature by temperature-reducing water, to the low-pressure gland portion, and the supply step is switched between the first supply step and the second supply step according to an operating state of the steam turbine.

11. The method for operating a combined cycle plant according to claim 10, wherein the first supply step is carried out in an operating region from start-up to a low load, and the second supply step is carried out during rated operation.

* * * * *